Jan. 28, 1964 W. E. BAUMGARTNER 3,119,206
LENS EDGING MACHINES
Filed Nov. 14, 1962 4 Sheets-Sheet 1

INVENTOR
WILLIAM E. BAUMGARTNER
By
Louis L. Gagnon
ATTORNEY

Jan. 28, 1964 W. E. BAUMGARTNER 3,119,206
LENS EDGING MACHINES
Filed Nov. 14, 1962 4 Sheets-Sheet 2

INVENTOR
WILLIAM E. BAUMGARTNER
By Louis L. Gagnon
ATTORNEY

INVENTOR
WILLIAM E. BAUMGARTNER
BY
Louis L. Gagnon
ATTORNEY

Jan. 28, 1964   W. E. BAUMGARTNER   3,119,206
LENS EDGING MACHINES
Filed Nov. 14, 1962   4 Sheets-Sheet 4

INVENTOR
WILLIAM E. BAUMGARTNER
By Louis L. Gagnon
ATTORNEY

United States Patent Office 3,119,206
Patented Jan. 28, 1964

3,119,206
LENS EDGING MACHINES
William E. Baumgartner, Buffalo, N.Y., assignor to American Optical Company, Southbridge, Mass., a voluntary association of Massachusetts
Filed Nov. 14, 1962, Ser. No. 237,618
9 Claims. (Cl. 51—101)

This invention relates to lens edging machines and has particular reference to improvements in size setting mechanisms on such machines for adjusting and setting the machines so as to provide lenses being edge ground with controlled contour shapes and sizes through the use of conventional profile cams or patterns which are contoured correspondingly to the shapes desired of said lenses.

In providing ophthalmic mountings with finished lenses, there is the requirement that the lenses be contoured to the particular eye shape of a mounting intended to receive the same and so controlled in size as to fit accurately and securely in the lens supporting eye sections of the mounting.

The requirement for proper shape of lenses is readily achieved in lens edging operations through the provision and use of conventional profile cams, better known as edging machine patterns, having shapes corresponding to the particular eye shapes of the ophthalmic mountings. However, with respect to the requirement for edging lenses to proper size, the industry has been plagued by a lack of standardization of edging machine pattern sizes and the resultant existence of patterns of many different sizes which must be dealt with in the trade.

Differently sized edging machine patterns are a result of different manufacturers of ophthalmic goods and lens edging equipment having set their own respective standards for pattern sizes and having each supplied the trade with patterns of their own selected size.

In accordance with the usual practice in edging lenses, a single pattern for a particular eye shape is used to edge lenses of various different sizes to meet the requirements of the different eye sizes of ophthalmic mountings intended to receive the same and edging machine manufacturers usually design their respective machines to operate with patterns of their own selected size. That is, edging machines are provided with size setting and control mechanism arranged and calibrated in accordance with the particular pattern size of the manufacturer's choice.

While most lens edging machines are or may be readily adapted to operate with practically all types and sizes of patterns available in the trade, the use of patterns other than those for which a machine size setting mechanism is designed and calibrated has heretofore required that an operator make compensation in setting his machine for lens size when patterns supplied by different ophthalmic frame manufacturers are used interchangeably to edge lenses.

The variety of pattern sizes presently encountered in the trade are of considerable concern, particularly to dispensers of optical goods having laboratories engaged in finishing and fitting lenses in ophthalmic mountings from different suppliers. In such cases, edging machine operators are required to exercise special alertness and skills in constantly being certain that their machines are properly regulated to compensate for differences in types and sizes of patterns.

Prior to this invention, an edging machine operator, in adjusting his size setting means, was required to be thoroughly familiar with the variations in sizes of patterns differing from the particularly pattern size for which his machine was calibrated and, accordingly, make compensations for pattern size variations by setting a size indicating member on his machine to read amounts greater or less than the actual reading which he would normally use with patterns of the type for which his machine was calibrated.

The consideration required as to whether a size setting mechanism should be adjusted to read a lens size directly when operating with one type of pattern or adjusted to read a larger or smaller size for ultimately producing the same size of lens with other types of patterns is a constant annoyance in the trade. Moreover, the possibility of error with the serious consequence of lens spoilage is ever-present in adjusting edging machines with conventional size setting mechanisms.

The present invention provides an improved size setting mechanism for lens edging machinery which, in obviating the above-mentioned shortcomings of conventional equipment of this nature, is readily adjustable in accordance with the particular size of pattern selected for use and in such manner as to provide, at all times, direct reading indications of sizes to which lenses will be accurately ground in said machinery regardless of the type of pattern selected for use.

Accordingly, the principal object of the invention is to simplify lens edging operations through the provision of a novel direct reading size setting mechanism of the above-mentioned character.

Another object is to provide a direct reading size setting mechanism embodying cooperatively functioning lens size indicating means and pattern size indicating means, one adjustable relative to the other to compensate the lens size indicating means for size differences in various types of edging machine patterns intended to be used interchangeably on said machinery.

Another object is to provide a lens size setting mechanism of the above character which is simple and economical to manufacture, readily adaptable to most conventional lens edging machines and requires no special skills to operate.

A further object is to provide in said mechanism, an arrangement which renders its lens size indicating means adjustable to compensate the same for grinding wheel wear in the edging machine together with the additional feature in said mechanism of adjustability in the freedom of movement of its manually operable parts to render said parts more or less frictionally resistant to adjustment in accordance with the "feel" of operation desired by a particular machine operator.

Other objects and advantages of the invention will become apparent from the following description when taken in conjunction with the accompanying drawings in which.

Figure 1:
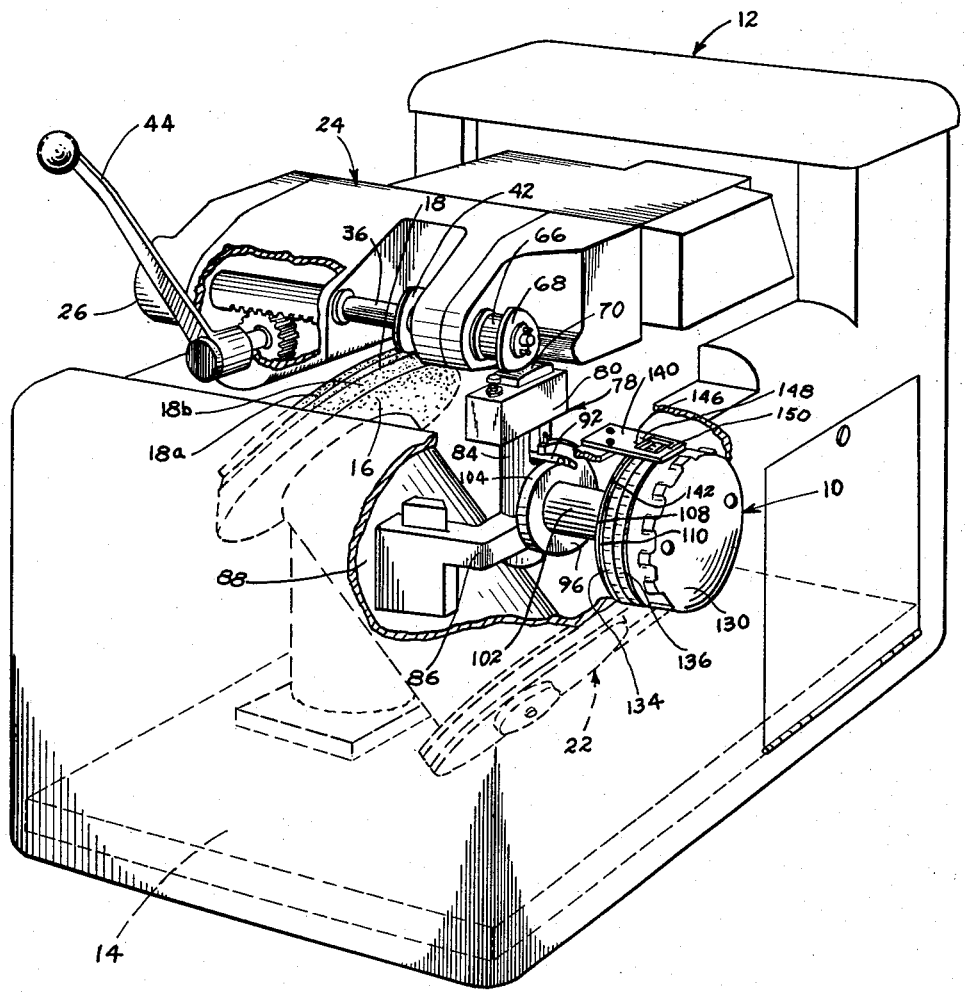
FIG. 1 is front perspective view of a lens edging machine embodying the improved size setting mechanism of the invention with portions of the machine being broken away to reveal details of the size setting mechanism.

Referring more particularly to the drawings wherein like characters of reference designate like parts throughout the several views it will be seen that the improved size setting mechanism 10 of the invention is illustrated as being in operative relation with a lens edging machine 12.

The machine 12, exclusive of mechanism 10, is typical of those regularly in use and to which the improved mechanism 10 of the invention is readily adaptable. However, for purposes of better understanding the invention which relates primarily to mechanism 10, the general structure and operation of edging machine 12 is outlined as follows:

Machine 12 comprises a base 14 upon which is supported a disc-like abrading wheel 16 having an effective abrading edge 18. Wheel 16 is rotated about its axis by a spindle 20 (see FIG. 3) connected by means of a belt and pulley drive arrangement 22 to a motor 23 also supported upon base 14.

A work supporting head 24 having a free end portion 26 in overlying relation with wheel 16 is supported rearwardly of machine 12 by a vertically disposed pivot post 28 on base 14. A collar 30 is journalled for rotation coaxially on pivot post 28 and head 24 is pivotally connected to collar 30 by means of a horizontally extending rod 32 engaged in collar 30 and extending through a bifurcated rearwardly disposed portion 33 of head 24.

Figure 2:
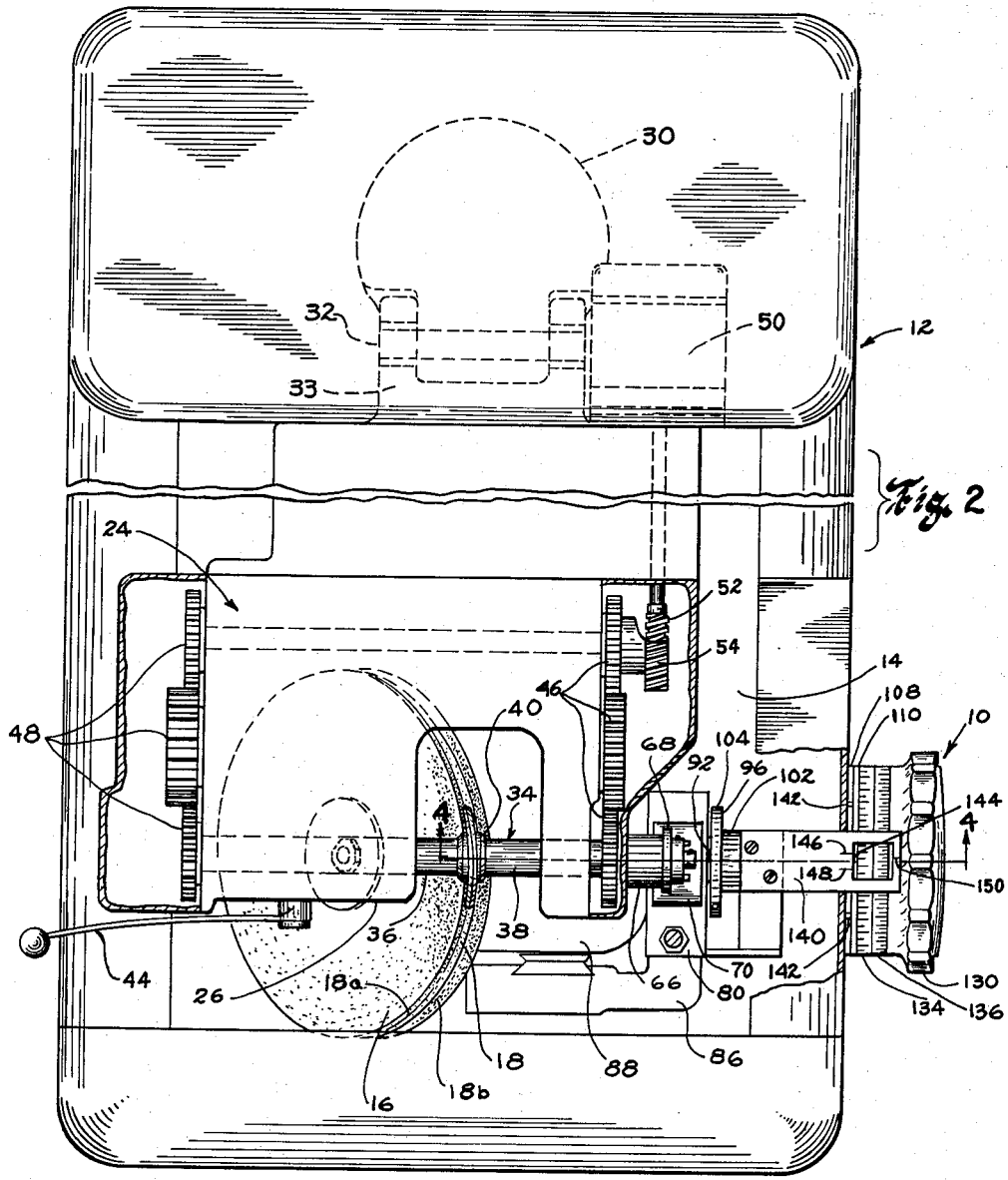
FIG. 2 is a partially broken away top plan view of the same edging machine.
Figure 3:
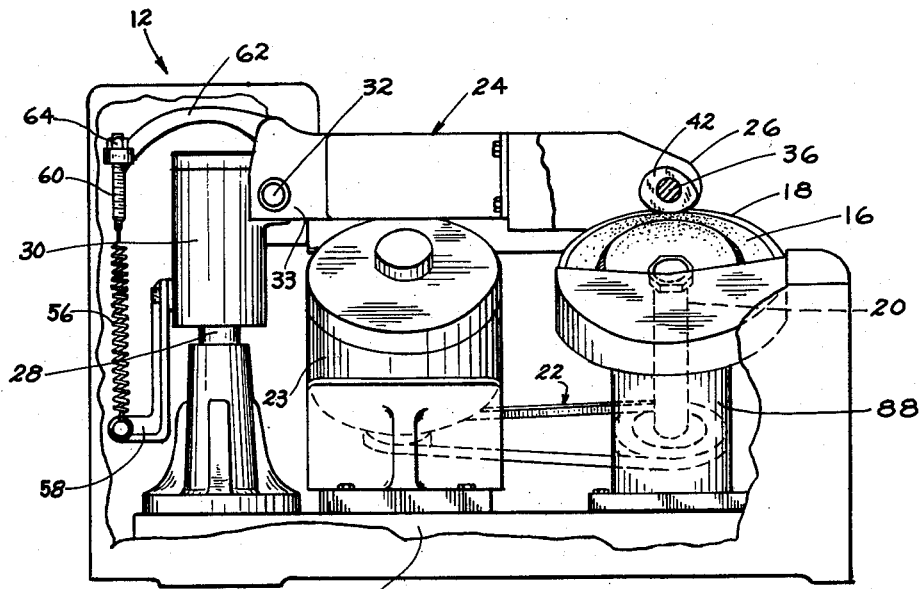
FIG. 3 is a side view of the edging machine with the outer portions thereof broken away.

As it can be seen in FIGS. 2 and 3, the arrangement of rod 32 and collar 30 on pivot post 28 supports head 24 in such manner as to allow its free end portion 26 to be universally moveable toward and away from the effective abrading edge 18 of wheel 16 and, at the same time, freely moveable laterally in directions across said effective abrading edge 18 by means of collar 30 on pivot post 28.

In the free end portion 26 of head 24 there is provided a horizontally disposed rotatable work supporting arbor 34 comprised of two coaxially related parts 36 and 38 each journalled for rotation in head 24. Parts 36 and 38 of arbor 34 are provided with lens clamping pads 40 on respective adjacent ends thereof between which a lens 42 to be edge ground is clamped. Part 38 of arbor 34 is fixed against longitudinal movement in head 24 while part 36 of arbor 34 is longitudinally adjustable in the conventional manner toward and away from part 38 by operation of handle 44 (see FIGS. 1 and 2) so as to permit removal or placement of lenses such as 42 in between clamping pads 40. With a lens 42 clamped in arbor 34 as illustrated in the drawings, it is revolved for edge grinding by rotating arbor 34. Interconnected gear trains 46 and 48 are provided at opposite sides of head 24 which are operated simultaneously by a drive motor 50 through a worm 52 and worm follower 54 to drive both parts 36 and 38 of arbor 34 simultaneously at equal rates and thereby revolve lens 42.

In order to effect edge grinding of lens 42 as it is being revolved, the free end portion 26 of head 24 is lowered to bring about engagement of the lens edge with the effective abrading edge 18 of wheel 16 simultaneously with rotation of wheel 16 about its axis.

While the end portion 26 of head 24 is free to move toward and away from wheel 16 to grind lens 42 to irregular contour shapes as will be subsequently described in detail, counterbalancing means in the form of a spring 56 (see FIG. 3) is provided to regulate the force with which the lens is urged by gravity against wheel 16. Spring 56 is extended between a bracket 58 on collar 30 and a longitudinally adjustable stud 60 on the free end of an arm 62 extending rearwardly from head 24. Movement of stud 60 longitudinally toward or away from spring 56 by operation of an adjusting nut 64 regulates the tension of spring 56 and controls the force with which lens 42 is permitted to rest against wheel 16.

Referring more particularly to the manner in which a lens such as 42 is ground to a desired contour shape, it can be seen in FIGS. 1, 2, 4 and 5 that machine 12, in the conventional manner, is provided with an adaptor 66 on part 38 of arbor 34 to which conventional edging machine patterns such as 68 are keyed in place for rotation with arbor 34.

Pattern 68 is provided with an edge contour corresponding to that desired to be provided on lens 42 and rests edgewise against a pattern shoe 70 which is supported by base 14 of machine 12. Shoe 70 is adjustable vertically to control the ultimate size to which lens 42 is ground.

Vertical adjustment of shoe 70 is brought about by operation of the size setting mechanism 10 in a manner which will be described in detail hereinafter together with a description of the structure of said mechanism 10.

First of all, it should be understood that the pattern 68 comes into engagement with shoe 70 only when a corresponding edge portion of lens 42 is ground down to finished size and that with pattern 68 engaging shoe 70, rotation of arbor 34 causes lens 42 and pattern 68 to rotate in unison whereby the eccentricity or particular irregular shape of pattern 68 will cause head 24 to raise and lower toward and away from wheel 16 causing lens 42 to be ground to a shape corresponding to the contour shape of the pattern 68.

The size to which lens 42 is ground is, of course, determined by the level to which shoe 70 is positioned relative the uppermost effective abrading portion of wheel 16.

Figure 5:
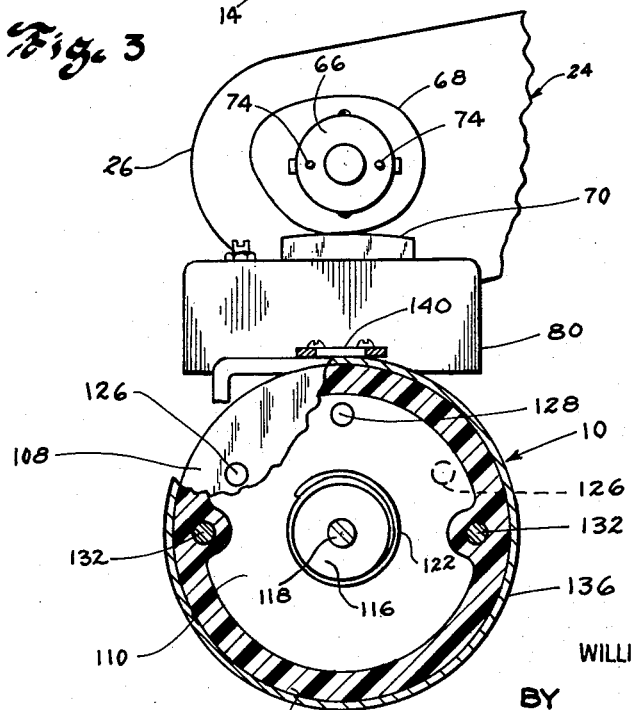
FIG. 5 is a cross-sectional view taken along line 5—5 in FIG. 4 looking in the direction indicated by the arrows.

It will be noted in FIGS. 1 and 5 that since wheel 16 is inclined as illustrated, its abrading edge 18 is arcuate in shape as viewed from one side of machine 12 and shoe 70 is provided with an arcuately shaped upper surface approximately of the same curvature as that of the side projection of wheel 16 so that at all points where the edge of lens 42 contacts wheel 16, the corresponding edge portion of pattern 68 will engage a similar location on shoe 70. Thus, with shoe 70 positioned at the same level as the uppermost effective abrading edge 18 of wheel 16, lens 42 will be accurately ground to the size and shape of pattern 68. However, with shoe 70 positioned at a level higher than the uppermost effective abrading edge 18 of wheel 16, the lens 42 will be edge ground to a larger size than that of pattern 68 but to the same contour shape. Conversely, with shoe 70 positioned at a lower level than the uppermost abrading edge of wheel 16 the lens 42 will become edge ground to a smaller size than that of pattern 68 while still taking on the same contour shape as pattern 68. In this way, by adjusting the position of shoe 70 to selected levels, one is able to edge grind lenses to different sizes with a single pattern.

Patterns such as 68 are detachably placed on the adaptor 66 and in most instances edging machines are provided with adaptors which will detachably receive and support patterns of two or more of the different types commonly encountered in the trade.

Figure 6:
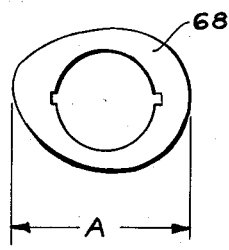
FIGS. 6 and 7 are plan views respectively of different types of conventional edging machine patterns.

By way of example, the adaptor 66 is shown herein as being receptive to two different types of patterns. Pattern 68, being of one type is shown in side elevation in FIG. 6 and, in FIG. 7, there is illustrated another type of pattern 72. Pattern 68 fits upon adaptor 66 and is keyed thereto in the manner best shown in FIGS. 1, 4 and 5. With pattern 68 removed, however, another pattern 72 of the type shown in FIG. 7 may be fitted upon adaptor 66 substantially as illustrated by dot-dash outline in FIG. 4. Pattern 72 would be keyed for rotation with the adaptor 66 and arbor 34 by pins 74 which extend into appropriate openings 76 (see FIG. 7) in pattern 72.

Figure 7:
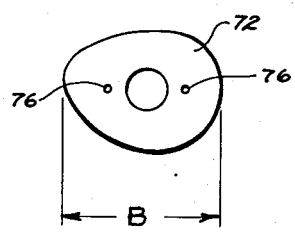

Further, by way of example and to illustrate the problem of the existence of patterns of various sizes in the trade, pattern 68 is shown as being larger than pattern 72. That is, dimension A of pattern 68 (FIG. 6) is greater than dimension B of pattern 72 (FIG. 7). Consequently, it can be seen that in order to edge grind lenses such as 42 to the same size with patterns such as 68 and 72 which might be used interchangeably, it is necessary to raise shoe 70 by an amount in accordance with the difference in sizes of said patterns when pattern 72 is used and to lower shoe 70 by the same amount when pattern 68 is used.

Setting the position or level of shoe 70 in accordance with the size desired of lens 42 and further in accordance with the particular size of pattern selected for use on adaptor 66 is accomplished through the provision of the size setting mechanism 10 functioning cooperatively with an adjustable shoe carrying member 78.

Figure 4:
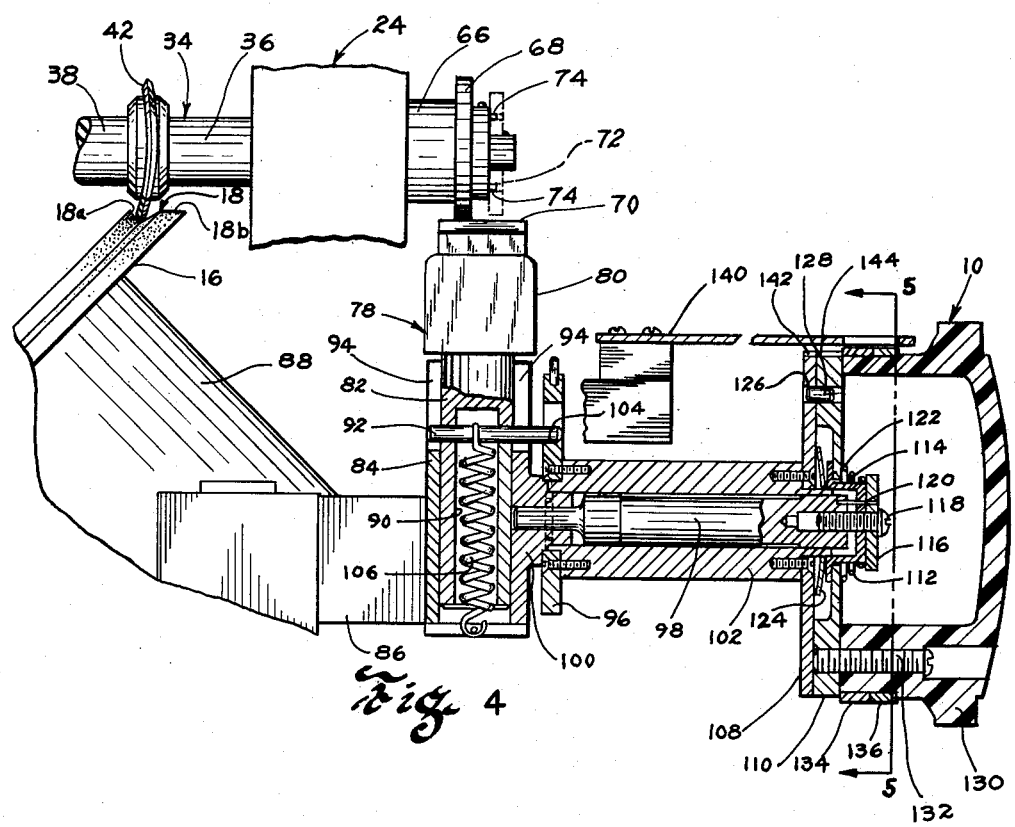
FIG. 4 is an enlarged fragmentary cross-sectional view taken generally along line 4—4 in FIG. 2 looking in the direction indicated by the arrows with portions of the edging machine shown in elevation.

The shoe carrying member 78 embodies a mount 80 for shoe 70 having a rod 82 depending therefrom and slidably fitted in an upstanding tubular section 84 of a bracket 86 arranged to support the entire structure of member 78 along with the size setting mechanism 10 (see FIG. 4).

Bracket 86 is fixedly mounted upon a housing 88 for spindle 20 of wheel 16 which housing 88 is, in turn, fixed to base 14 of machine 12.

Rod 82 is provided with a longitudinal bore 90 opening outwardly at its terminal end and extending throughout the major portion of its length. A cam following pin 92 is provided to extend transversely diametrically through rod 82 and guide slots 94 are provided at opposite sides of tubular section 84 to receive protruding portions of pin 92 and function as guide means to prevent rotational misalignment of the shoe carrying member 78 during movement thereof longitudinally in bore 90.

The size setting mechanism 10, which functions to raise and lower shoe carrying member 78 by actuation of a constant rise cam 96, comprises, as shown in FIG. 4, an axle 98 extending horizontally from the tubular section 84 of bracket 86. One end of axle 98 is rigidly fixed in an enlarged protruding portion 100 of section 84.

A sleeve 102 is journalled for rotation on axle 98 and cam 96 is secured to the end of sleeve 102 adjacent shoe carrying member 78 so as to be rotatable with sleeve 102. As it can be seen in FIGS. 1 and 2, pin 92 extends beyond section 84 into engagement with a spiral constant rise camming surface 104 of cam 96 and is held firmly in place thereagainst at all times by a spring 106 within bore 90 in the shoe carrying member 78. Spring 106 is attached at one end to pin 92 within bore 90 and has its opposite end fixed to bracket 86 adjacent the lowermost end of section 84 thereof.

It can be seen that with the above-described structure, rotation of cam 96 in one direction caused by rotation of sleeve 102 will bring about a lifting of shoe carrying member 78 while rotation of cam 96 in an opposite direction will lower the shoe carrying member 78. Thus, adjustment of the level of shoe 70, relative to wheel 16 is accomplished by rotation of sleeve 102.

An annular plate member which will hereinafter be referred to as the index plate 108 is secured to the end of sleeve 102 opposite to its end which supports cam 96 and a second annular plate member which will hereinafter be referred to as the indexing plate 110 is supported by the terminal end of axle 98 for rotation together with index plate 108 or selectively for rotation independently of index plate 108 (see FIG. 4).

The indexing plate 110 is mounted on axle 98 through the provision of a cup-shaped bearing mount 112 having an outer cylindrical surface 114 over which indexing plate 110 is fitted for rotation as shown in FIG. 4.

Bearing mount 112 is provided with a washer 116 against its forward side and is secured to the terminal end of axle 98 by a screw 118. A pin 120 prevents bearing mount 112 from rotating relative to axle 98. Between indexing plate 110 and washer 116 a spring 122 is placed under compression to constantly urge the indexing plate 110 against index plate 108 and a spring washer 124 is placed between index plate 108 and the adjacent end of bearing mount 112 to provide a friction drag between the rotatable index plate 108 and the non-rotatable bearing mount 112. The extent of frictional drag imparted by spring washer 124 may be adjusted by screw 118 which, when threaded deeper into axle 98, forces the bearing mount 112 toward spring washer 124 to increasingly compress the same and increase drag on index plate 108. Threading of screw 118 outwardly of axle 98 will accordingly reduce drag on index plate 108.

As it can be seen in FIGS. 4 and 5, plate 108 is provided with three index openings 126 in spaced relation with each other and at equal radial distances from the axis of plate 108. Plate 110 is provided with an indexing pin 128 adapted to fit selectively into any one of the openings 126 upon withdrawal from one opening and rotation of plate 110 into alignment with another opening.

Actuation of the size setting mechanism 10 is accomplished by manual operation of a knob 130 which is secured upon indexing plate 110 with holding screws 132. Ring-like lens size reading scales 134 and 136 are partially recessed into knob 130 and arranged thereon to abut indexing plate 110. Scales 134 and 136 are fixed against rotation on knob 130 when holding screws 132 are fully tightened but may be rotatably adjusted on knob 130 when screws 132 are loosened.

Scales 134 and 136 are provided with markings 138 so calibrated in accordance with the rise characteristics of cam 96 as to preferably indicate one millimeter changes in the ultimate size of a lens being edge ground when the knob 130 of size setting mechanism 10 is rotated to cause rotation of cam 96 to adjust the level of shoe 70.

A fixed pointer 140 supported from bracket 86 is provided to extend over scales 134 and 136 to indicate lens size settings of mechanism 10. Also, indicating marks preferably in the form of notches 142 on the peripheral edge of index plate 108 at respective radial locations of openings 126 therein and a notch 144 on the peripheral edge of indexing plate 110 at the radial location of pin 128 are provided to indicate selected indexable positions of plate 110 relative to plate 108; the indexable positions being those where pin 128 will fit into a selected one of the openings 126.

The size setting mechanism 10 is operated and functions in the following manner to provide direct reading indications of sizes to which lenses may be ground when patterns of different types and sizes are used:

It can be seen that with plates 108 and 110 interlocked by pin 128 as shown in FIG. 4, rotation of knob 130 will cause simultaneous rotation of the scales 134 and 136 together with sleeve 102 and cam 96 to raise or lower shoe 70 to a desired setting with the result of causing lens 42 to be edge ground to a larger or smaller size in accordance with the direction in which knob 130 is rotated for a size setting. Scale 134, being calibrated to indicate lens size as read against a line 146, for example on pointer 140 (see FIG. 2) will then indicate the size to which lens 42 will be ground with a pattern such as 68 of known size. If, however, pattern 68 is exchanged for one of only a slightly smaller size, compensation for change in pattern size may be made by reading scale 134 against a second line 148 on pointer 140 which second line 148 is spaced from line 146 an amount in accordance with the slight difference in pattern sizes. However, if pattern 68 was replaced by a pattern such as 72 of a considerably different size, it can be seen that neither of the lines 146 or 148 will suffice for direct size reading upon scale 134.

In such a case, mechanism 10 is rotatably indexed to reposition scale 134 an amount in accordance with the difference in sizes between patterns 68 and 72. This is accomplished by grasping knob 130, pulling it and plate 110 away from plate 108 against the tension of spring 122 so as to release pin 128 from a particular opening 126 and thereafter rotating knob 130 to align notch 144 on plate 110 with a different selected notch 142 on plate 108 whereupon release of knob 130 will allow spring 122 to bring plate 110 against plate 108 and engage pin 128 in another opening 126. This repositions scale 134 relative to the position of cam 96 by an amount equal to the difference in sizes of patterns 68 and 72. In this way, by reading the scale 134 against line 146 on pointer 140 a true direct reading indication of any desired lens size may be had while using pattern 72.

It is pointed out that openings 126 are arcuately spaced relative to each other by amounts predetermined in accordance with variations in the sizes of patterns intended to be used on machine 12. Thus, indexing of mechanism 10 from one opening to another in the above-described manner resets or compensates the size indicating scale 134 in accordance with the size differences in patterns which are intended to be used interchangeably on machine 12.

It should be understood that more index positions than have been illustrated may be provided in the mechanism 10 simply by adding more openings 126 in plate 110 at strategically located positions in accordance with the sizes of different patterns expected to be used on machine 12.

Scale 136 on knob 130 would be read against a line 150 on the side of pointer 140 opposite to lines 146 and 148 and is shown only to illustrate that more than one lens size scale may be provided on knob 130. In such a case, as it is conventional, scale 134 would be used to indicate lens sizes for lenses being ground with a beveled edge in the groove 18a of wheel 16, as illustrated throughout the drawings and scale 136 would be used to indicate lens sizes for lenses being ground on the flat edge portion 18b of wheel 16. Flat edged lenses are used in the trade on rimless type mountings. Since flat edged lenses would be ground smaller than bevel-edged lenses by an amount equal to the thickness of the bevel, the indicia on scale 136 would normally be rotatably offset relative to the indicia on scale 134 by the amount of said thickness of bevel or, alternatively, the line 150 on pointer 140 might be offset from lines 146 or 148 by said amount.

From the above, it can be seen that the effect produced by indexing the mechanism 10 from one indexed position to another wherein pin 128 on index plate 110 interfits with a selected opening 126 in index plate 108 is actually that of rotatably repositioning or resetting scales 134 and 136 relative to cam 96 in accordance with the differences in sizes of patterns used on machine 12.

It is pointed out that when grinding wheel wear or occasional dressing of the grinding wheel 16 causes its diameter to be reduced and the uppermost portion of its effective abrading edge 18 to be accordingly lowered in machine 12, compensation for such a situation is made simply by loosening screws 132 and rotatably adjusting scales 134 and 136 together an amount in accordance with the amount of wear or dressing of wheel 16 whereupon screws 132 are again tightened to fix the scales.

In relation to the feature of adjustability in the freedom of movement of the manually operable parts of mechanism 10, adjustment of screw 118 which regulates the frictional drag imparted by washer 124 between the rotatable index plate 108 and the non-rotatable bearing mount 112 is usually made by an operator of the edging machine so as to render the knob 130 more or less resistant to rotation in accordance with a particular "feel" of operation desired. Certain edging machine operators find it preferable to have their size setting mechanisms freely adjustable while others find it more efficient in operation and preferable to have their size setting mechanisms more resistant to adjustment.

From the foregoing it can be seen that simple, efficient and economical means have been provided for accomplishing all of the objects and advantages of the invention. Nevertheless, many changes in the details of construction and arrangement of parts may be made without departing from the spirit of the invention as expressed in the accompanying claims and the invention is not to be limited to the exact matters shown and described as only preferred matters have been given by way of illustration.

Having described my invention, I claim:

1. In a lens edging machine of the character described, the improvement consisting of a direct reading size setting mechanism for selectively positioning an adjustable shoe relative to the effective lens abrading area of a grinding wheel in said machine in accordance with different sizes of edging machine patterns which are to be used interchangeably on said machine and wherein said patterns function during simultaneous rotation thereof coaxially with a lens being edge ground to engage said shoe and provide said lens with a contour shape corresponding to that of the pattern being used while the size to which said lens is ground is determined by the related positions of said adjustable shoe and said effective abrading area of said grinding wheel, said size setting mechanism comprising a supporting axle fixed to said machine, a sleeve journalled on said axle and rotatable coaxially thereon, a cam fixed upon a first end of said sleeve and rotatable therewith, means associated with said adjustable shoe and in engagement with said cam for adjusting said shoe relative to said effective lens abrading area of said grinding wheel in response to rotation of said cam and sleeve, a pair of coaxially related annular plate members disposed in side-by-side relation with each other with the respective planes of their sides directed substantially right angularly to the common axis of said axle and sleeve, a first of said plate members being fixed to the second end of said sleeve for rotation therewith about said axle, means supporting the second of said plate members rotatably on said axle, a knob secured to a side of said second plate member for manually operating said size setting mechanism, means functioning to resiliently bias said second plate member against said first plate member to render said members rotatable as a unit by actuation of said knob, said biasing means being constructed and arranged to permit axial movement of said second plate member and knob away from said first plate member to render said second plate member independently rotatable to different oriented positions relative to said first plate member, markings on respective edges of said first and second plate members for indicating selected oriented positions of said second plate member relative to said first plate member in accordance with the size of an edging machine pattern selected for use on said lens edging machine, a lens size determining scale arranged circumferentially on said knob readable realtive to a fixed pointer on said machine for adjusting said size setting mechanism in accordance with the ultimate size desired of a lens to be edge ground in said machine.

2. A direct reading size setting mechanism for a lens edging machine of the character described wherein edging machine patterns of different sizes are to be used interchangeably on said machine, said size setting mechanism comprising a supporting axle, a sleeve journalled on said axle for coaxial rotation thereon and having its opposite ends disposed adjacent respective opposite ends of said axle, a pair of substantially coaxially related annular plate members, a first of said plate members being fixed to one end of said sleeve for rotation therewith, said second plate member being normally positioned with one of its sides disposed against a side of said first plate member, means supporting said second plate member for rotation about said axle independently of said first plate member, a knob on the opposite side of the second of said plate members for manually operating said size setting mechanism, means functioning to bias said second plate member against said first plate member to render said members and sleeve rotatable as a unit, said biasing means being constructed and arranged to permit axial movement of said second plate member and knob away from said first plate member to render said second plate member selectively rotatable by manipulation of said knob to different oriented positions relative to said first plate member without rotation of said first plate member and sleeve, markings on respective edges of said first and second plate members for indicating selected oriented positions of said second plate member relative to said first plate member in accordance with the size of edging machine pattern selected for use on said edging machine and a lens size determining scale arranged circumferentially on said knob readable relative to a fixed pointer on said edging machine for adjusting said size setting mechanism by rotation of said knob in accordance with the ultimate size desired of a lens to be edge ground in said machine.

3. A lens size setting mechanism for a lens edging machine comprising an axle for supporting said mechanism, a sleeve rotatable on said axle and having its opposite ends disposed adjacent respective opposite ends of said axle, a first annular plate member fixed to one end of said sleeve for rotation therewith, a second annular plate member normally positioned with one of its sides disposed adjacent a side of said first plate member, means on said axle for supporting said second plate member in substantially coaxial relation with said first plate member and independently rotatable relative to said first plate member, said supporting means further being constructed and arranged to permit movement of said second plate member toward and away from said first plate member, indexing means on said first and second plate members for interlocking the same against relative rotation at different selected indexed positions of orientation of said second plate member relative to said first plate member, said indexing means being releasable upon movement of said second plate member away from said first plate member to permit rotation of said second plate member independently of said first plate member to said different oriented positions, a knob on said second plate member for manually rotating said plate members and sleeve as a unit when said plate members are interlocked and for selectively withdrawing second plate member from said first plate member and rotating the same independently of said first plate member, lens size indicating scale means rotatable with said knob and marking means on said plate members for indicating said indexed positions thereof.

4. In a lens edging machine of the character described, the improvement consisting of a size setting mechanism for selectively positioning an adjustable shoe relative to the effective lens abrading area of a grinding wheel in said machine in accordance with different sizes of different edging machine patterns which are to be used interchangeably on said machine wherein said patterns function during rotation thereof and during simultaneous coaxial rotation with a lens being edge ground to engage said shoe and provide said lens with a contour shape corresponding to that of the pattern being used while the size to which said lens is ground is determined by the related positions of said adjustable shoe and said effective abrading area of said grinding wheel, said size setting mechanism comprising a supporting axle fixed to said machine, a sleeve journalled on said axle and rotatable coaxially thereon, a cam fixed upon a first end of said sleeve and rotatable therewith, means associated with said adjustable shoe and cam for positionally adjusting said shoe relative to said effective lens abrading area of said grinding wheel in response to rotation of said cam, a pair of coaxially related annular plate members disposed in side by side relation with each other and with the respective planes of their sides directed substantially right angularly to the common axis of said axle and sleeve, a first of said plate members being fixed to the second end of said sleeve for rotation therewith about said axle, mounting means on said axle adjacent said second end of said sleeve having an outer cylindrical bearing surface concentric with the common axis of said axle and sleeve and upon which the second of said plate members is rotatably positioned, first spring means between said first plate member and said mounting means in frictionally engaging relation with respective adjacent sides thereof, said mounting means being fixed against rotation on said said axle and adjustable toward and away from said first plate member for regulating tension applied to said first plate member by said first spring means, a knob secured to the opposite side of said second plate member for manually operating said size setting mechanism, second spring means functioning to resiliently bias said second plate member against said first plate member, said second spring means being constructed and arranged to permit axial movement of said second plate member and knob carried thereby away from said first plate member along said bearing surface of said mounting means to render said second plate member independently rotatable by operation of said knob to different oriented positions relative to said first plate member, interfitting means on said plate members for rendering the same rotatable together when in adjoining side-by-side relation and disengageable when said second plate member is moved axially away from said first plate member, said interfitting means being arranged on respective plate members to interfit at different preselected oriented positions of rotational adjustment of said second plate member relative to said first plate member in accordance with the size of edging machine pattern selected for use on said lens edging machine, markings on respective edges of said first and second plate members for indicating said preselected oriented positions of said plate members and a lens size indicating scale arranged circumferentially on said knob readable relative to a fixed pointer on said machine for adjusting said size setting mechanism in accordance with the ultimate size desired of a lens to be edge ground in said machine subsequent to said selective rotational orientation of said first and second plate members.

5. A size setting mechanism for a lens edging machine of the character described comprising a supporting axle, a sleeve journalled on said axle and rotatable coaxially thereon, said sleeve having its opposite ends disposed adjacent respective opposite ends of said axle, a pair of substantially coaxially related annular plate members, a first of said plate members being fixed to one end of said sleeve for rotation therewith about said axle, mounting means on said axle adjacent said one end of said sleeve and having an outer cylindrical bearing surface concentric with said common axis of said axle and sleeve, said second plate member being mounted for rotation on said bearing surface of said mounting means with a first of its sides normally being positioned against said first plate member, a first spring member under compression between said first plate member and said mounting means, said mounting means being fixed against rotation on said axle and adjustable toward and away from said first plate member for regulating the tension applied to said first plate member by said first spring member, a spring retainer fixed to said mounting means in spaced relation with the second side of said second plate member, a second spring member under compression between said retainer and said second plate member functioning to resiliently bias said second plate member toward said first plate member, said second spring member being compressible so as to permit axial movement of said second plate member and knob away from said first plate member to render said second plate member selectively rotatable by actuation of said knob to different oriented positions relative to said first plate member without rotation of said first plate member and sleeve interfitting indexing means on said plate members for rendering the same rotatable together when in adjoining side-by-side relation and disengageable when said second plate member is moved axially away from said first plate member, said indexing means embodying a pin protruding from one of said plate members toward the other plate member, said other plate member having a plurality of spaced openings adapted to selectively receive said pin when said second plate member is rotated to different oriented positions relative to said first plate member, markings on respective edges of said first and second plate members for indicating selected oriented positions of said second plate member relative to said first plate member where said pin will fit within one of said openings, said openings being spaced from one another amounts in accordance with the differences in sizes of respective edging machine patterns intended to be used interchangeably on said edging machine and a lens size indicating scale arranged circumferentially on said knob readable relative to a fixed pointer on said edging machine for adjusting said size setting mechanism in accordance with the ultimate size desired of a lens to be edge ground in said machine.

6. In a lens edging machine embodying a base having a rotatable grinding wheel supported for rotation thereon and a lens supporting head on said base having rotatable lens holding means arranged to receive and rotate a lens about its axis together with means permitting movement of said head toward and away from an effective abrading edge of said grinding wheel to present a lens edgewise into abrading relation with said abrading edge of said grinding wheel and a pattern of predetermined contour shape and size detachably mounted on said lens holding means arranged to engage an adjustable shoe carried by supporting means on said base for controlling the finished edge shape and size of said lens, the improvement consisting of a size setting mechanism on said machine for selectively positionally adjusting said shoe relative to said effective abrading edge of said grinding wheel in accordance with the size of said pattern and the size desired of said lens, said size setting mechanism comprising an axle having one end fixedly mounted on said machine a rotatable sleeve journalled on said axle and having its opposite ends terminating respectively adjacent the opposite ends of said axle, a cam fixed upon a first end of said sleeve, said cam being rotatable with said sleeve and so associated with said shoe as to cause the same to move toward and away from said pattern upon rotation of said sleeve, a pair of substantially coaxially related annular plate members, a first of said plate members being fixed to said sleeve adjacent the second end thereof for rotation with said sleeve, a knob carried by the second of said plate members for manually operating said size setting mechanism, means supporting said second plate member for rotation about said axle independently of said first plate member, means for biasing said second plate member toward said first plate member to render said plate members together with said sleeve and cam rotatable simultaneously by actuation of said knob, said biasing means being constructed and arranged to permit axial movement of said second plate member and knob away from said first plate member to render said second plate member free of said first plate member and independently rotatable to different oriented positions relative to said first plate member in accordance with the size of pattern selected for use on said lens holding means and lens size indicating scale means arranged circumferentially on said knob and readable relative to a fixed pointer on said machine for indicating adjustment of said size setting mechanism in accordance with the desired size to which said lens is to be ground.

7. A lens size setting device for a lens edging machine comprising an axle, a sleeve rotatable on said axle, a first engagement member fixed to one end of said sleeve for rotation therewith, a second engagement member normally positioned adjacent said first member and being supported for rotation relative to and for movement toward and away from said first member and indexing means on said first and second members for interlocking the same against relative rotation at different selected indexed positions of orientation of said second member relative to said first member.

8. A lens size setting device for a lens edging machine comprising an axle, a sleeve rotatable on said axle, a first engagement member fixed to one end of said sleeve for rotation therewith, a second engagement member normally positioned adjacent said first member and being supported for rotation relative to and for movement toward and away from said first member, indexing means on said first and second members for interlocking the same against relative rotation at different selected indexed positions of orientation of said second member relative to said first member, said indexing means being releasable upon movement of said second member away from said first member to permit rotation of said second member independently of said first member to selectively orient said second member at different indexed positions and manually operable means carried by said second member for imparting said movement thereto.

9. In a lens edging machine of the character described, the improvement consisting of a direct reading size setting mechanism for selectively positioning an adjustable shoe relative to the effective lens abrading area of a grinding wheel in said machine in accordance with different sizes of edging machine patterns which are to be used interchangeably on said machine and wherein said patterns function during simultaneous rotation thereof coaxially with a lens being edge ground to engage said shoe and provide said lens with a contour shape corresponding to that of the pattern being used while the size to which said lens is ground is determined by the related positions of said adjustable shoe and said effective abrading area of said grinding wheel, said size setting mechanism comprising a supporting axle fixed to said machine, a sleeve journalled on said axle and rotatable coaxially thereon, a cam fixed upon a first end of said sleeve and rotatable therewith, means associated with said adjustable shoe and in engagement with said cam for adjusting said shoe relative to said effective lens abrading area of said grinding wheel in response to rotation of said cam and sleeve, a first engagement member fixed to the second end of said sleeve for rotation therewith, a second engagement member normally positioned adjacent said first member and being supported for rotation relative to and for movement toward and away from said first member, indexing means on said first and second members for interlocking the same against relative rotation at different selected indexed positions of orientation of said second member relative to said first member, said indexing means being releasable upon movement of said second member away from said first member to permit rotation of said second member independently of said first member to selectively orient said second member at different indexed positions in accordance with different sizes of edging machine patterns to be used on said machine, manually operable means for rotating said members, sleeve and cam as a unit when said members are interlocked to adjust said shoe relative to said effective abrading area of said grinding wheel in accordance with the size desired of a lens to be ground by said machine and lens size indicating means on said manually operable means for indicating the extent of adjustment required of said shoe to obtain a desired lens size.

References Cited in the file of this patent
UNITED STATES PATENTS 2,674,068    Eves et al. _____ Apr. 6, 1954